United States Patent
Sirois et al.

[11] Patent Number: 6,062,763
[45] Date of Patent: May 16, 2000

[54] RETAINER FOR A SHOCK MOUNT

[75] Inventors: Thomas Sirois, Wolcott; Harold Slocum, Oakville, both of Conn.; Edward W. Turska, Bloomfield Hills, Mich.

[73] Assignee: Illinois Tool Works, Inc., Glenview, Ill.

[21] Appl. No.: 09/081,834

[22] Filed: May 19, 1998

[51] Int. Cl.$^7$ ............................................... F16B 2/24
[52] U.S. Cl. ........................... 403/329; 403/326; 248/635
[58] Field of Search ................................. 403/365, 366, 403/371, 372, 326, 329, 202–203; 248/635, 634; 296/35.1; 285/340; 267/141.1, 281, 283, 153; 44/525, 526

[56] References Cited

U.S. PATENT DOCUMENTS

| | | | |
|---|---|---|---|
| 312,943 | 2/1885 | Winans | 411/525 X |
| 2,144,170 | 1/1939 | Utz et al. | 296/35 |
| 2,520,757 | 8/1950 | Cain | 248/22 |
| 2,708,560 | 5/1955 | Paley | 248/204 |
| 3,128,999 | 4/1964 | Schmitt | 267/1 |
| 3,193,237 | 7/1965 | Adams | 248/358 |
| 3,218,101 | 11/1965 | Adams | 296/35 |
| 3,622,194 | 11/1971 | Bryk | 296/35 R |
| 3,673,911 | 7/1972 | Ramillon | 411/526 X |
| 3,893,221 | 7/1975 | Lehmann | 411/526 X |
| 4,014,588 | 3/1977 | Kohriyama | 296/35 R |
| 4,286,777 | 9/1981 | Brown | 267/63 R |
| 4,513,990 | 4/1985 | Morita et al. | 280/725 |
| 4,541,612 | 9/1985 | Yohner | 403/326 X |
| 4,720,075 | 1/1988 | Peterson et al. | 248/635 |
| 4,783,039 | 11/1988 | Peterson et al. | 248/635 |
| 4,921,203 | 5/1990 | Peterson et al. | 248/635 |
| 5,170,985 | 12/1992 | Killworth et al. | 248/635 |
| 5,178,433 | 1/1993 | Wagner | 296/35.1 |

*Primary Examiner*—Harry C. Kim
*Attorney, Agent, or Firm*—St. Onge Steward Johnston & Reens LLC

[57] ABSTRACT

A spring element for a shock mount is adapted for low insertion force and higher separation force in securing together a spacer tube and a thimble in a shock mount.

4 Claims, 2 Drawing Sheets

RETAINER FOR A SHOCK MOUNT

FIELD OF THE INVENTION

The present invention relates to a spring element for a shock isolating mount (also referred to hereinafter as a "shock mount") used in securing part of a heavy structure, such as a vehicle body, to a support, such as the frame of the vehicle, and absorbing vibrations or shocks between the two structures.

BACKGROUND OF THE INVENTION

A shock mount that has been used in the automotive industry for securing and supporting the body or cab of a vehicle on its frame comprises two mating rings of elastically resilient material between which a body mounting part such as an ear protruding from the vehicle is engaged and clamped by a two-part spool that is seated on the vehicle frame and fixed to it by a threaded fastener. The spool parts have flanges which bear against the opposite sides of the mating rings and are threaded together so that by turning one spool part relative to the other the elastic rings and the body mounting part between them are clamped tightly between the flanges. One of the spool parts is a tubular spacer having an annular flange integral with a deep drawn tube that is internally left hand threaded. The other spool part is a thimble having an annular flange integral with a deep drawn tube that is externally left-hand threaded to fit inside and engage its thread with the screw thread of the tubular spacer. A torque nut is welded to the outer face of the thimble flange.

The mating elastic rings of the prior art are provided with an oblong projection and an oblong cavity so that they may be mated only when the projection and cavity are properly aligned.

This known shock mount is assembled by inserting the spacer tube through the center of one of the mating elastic rings, and through an opening in the body mounting part. The second mating elastic ring is then fitted over the end of the spacer tube. The end of the thimble tube is placed in the end of the spacer tube, and the thimble is turned to thread it into the spacer tube and clamp the elastic rings tightly together on the body mounting part. Then, the spool assembly and body part is seated in place on the vehicle frame, and the threaded fastener is passed up through an opening in the frame, through the tubes and the assembled spool parts, and is threaded into the nut welded onto the thimble until the entire assembly is fixed securely to the frame.

It has been found that several practical drawbacks impeded effective fastening by the prior art assembly.

During production line assembly of the spool parts crossing and jamming of the left-hand thread can and sometimes does occur, preventing the assembly from clamping together properly. An additional drawback of the known assembly becomes apparent if cross-threading of the threaded fastener and the welded nut occurs, because torque applied to the fastener in an attempt to unscrew the threaded fastener can instead cause the left-hand threaded thimble to unscrew from the spacer, jamming the entire assembly so that the unit must be cut off. The jamming and cross-threading can slow or stop the production line, increasing manufacturing cost.

The problems associated with this known shock mount have been addressed in U.S. Pat. No. 4,720,075, issued Jan. 19, 1988, and in U.S. Pat. No. 4,783,039, issued Nov. 8, 1988, and U.S. Pat. No. 4,921,203, issued May 1, 1990 (the disclosure of which is hereby incorporated by reference).

These patents disclose a two-part telescoping spool including a spacer and a thimble. Two mating resilient rings are mounted on each of the spacer and thimble, and the support part of a vehicle frame is disposed between these rings. A carriage bolt engages the thimble and allows the simultaneous securing of a body mounting part and clamping of the support part. The thimble and the spacer have mutually engaging means for limiting rotation of either of them relative to the other. Preferably, the spacer tube is formed at its axial end opposite the spacer flange into a polygon, as viewed in cross-section. The thimble tube is formed at the tube shoulder adjacent the thimble flange into a complementary polygonal shape, so that the thimble polygon formation can be received in the spacer polygon formation, preventing rotation of the two members relative to each other. The two-part spool further includes means on the inside of the spacer member for engaging an end portion of the thimble member for resisting separation of the spacer and thimble members when the thimble tube is received in the spacer tube. The engaging means disclosed in U.S. Pat. Nos. 4,720,075 and 4,783,039 comprises a plurality of inward protrusions, which is disclosed as a six tooth washer, located inside the spacer tube so that the teeth engage an enlarged end of the thimble tube. U.S. Pat. No. 4,921,203 disclosed an engaging means which comprises alternating longer aligning tabs and shorter retaining tabs.

Another known shock mount, disclosed in U.S. Pat. No. 3,218,101, issued Nov. 16, 1965, uses an interfitting thimble and spacer without means for preventing rotation of the two members, and in which the thimble can be retained in the spacer by a sleeve located between the outer walls of the thimble and the inner walls of the spacer. The sleeve frictionally mounts to the outer walls of the thimble and has detent tongues that impinge on the inner walls of the spacer to resist separation. This approach does not provide of sufficient force to resist separation of the thimble and spacer in accordance with most automobile manufacturers' current specifications.

In this respect, most automobile manufacturers have a preference for shock mounts using the telescoping, interfitted thimble and spacer (as described above in connection with U.S. Pat. Nos. 3,218,101; 4,720,075; and 4,783,039) instead of a threaded device as described in this application. Such manufacturers typically specify that shock mounts supplied to them have a minimal insertion force and a higher separation force. In other words, the thimble should be able to be inserted into the spacer with a low insertion force (to minimize assembly worker injuries from repetitive motion) but a significantly higher separation force (to insure that the thimble and spacer, once fitted together, remain assembled together with the annular rings and the body part therebetween, so as to keep the components together until the vehicle body is bolted to the frame using the carriage bolt). A typical requirement for insertion force is 40 lbs., and a typical request for separation force is 360 lbs.

As noted above, the device disclosed in U.S. Pat. No. 3,218,101 does not meet such requirements, as it provides a design in which the separation force is higher, but not significantly higher than the insertion force.

One method and device used in the industry to meet the requirements for insertion and separation force is an interfitting thimble and spacer, without means for preventing rotation of the thimble relative to the spacer. In such devices, the thimble may have a straight tube and flange, and the spacer may have an inwardly extending lip. After the thimble and spacer are fitted together, a special tool is used to deform the thimble tube and to create a knob end which is larger than the diameter of the space within the inwardly extending lip of the spacer, to prevent separation of the thimble and spacer. This approach is relatively time-consuming and complicated.

The present invention is therefore directed to an improved retainer for retaining together a spacer and thimble in a shock mount, which can be used in shock mounts in which the thimble and spacer both have, or do not have, an antirotation feature.

SUMMARY OF THE INVENTION

It is an object of the present invention to provide a spring element useful in a shock mount of the type making use of a spacer and a telescoping thimble for clamping together elastically resilient rings between which is disposed a support part of a vehicle frame, and in which a single fastening device serves the dual functions of drawing the parts of the shock mount together and securing the shock mount assembly and vehicle frame to a body mounting part.

It is a further object of the invention to provide a spring element which is adapted to provide a low insertion force of the thimble into the spacer tube, but a higher separation force to remove the thimble from the spacer tube.

In accordance with the invention, a retainer for a shock mount comprises an annular ring having first tabs extending radially inwardly from a lower end thereof, and second tabs which are shorter than the first tabs, extending radially inwardly from the same end of the annular ring. The first and second tabs are located alternately with each other. Most preferably, the aligning tabs and the holding tabs extend radially inwardly at substantially the same angle, and there are six each of the aligning tabs and holding tabs.

Other objects, aspects and features of the present invention in addition to those mentioned above will be pointed out in or will be understood from the following detailed description provided in conjunction with the accompanying drawings.

DETAILED DESCRIPTION OF THE PREFERRED EMBODIMENT

Figure 3:
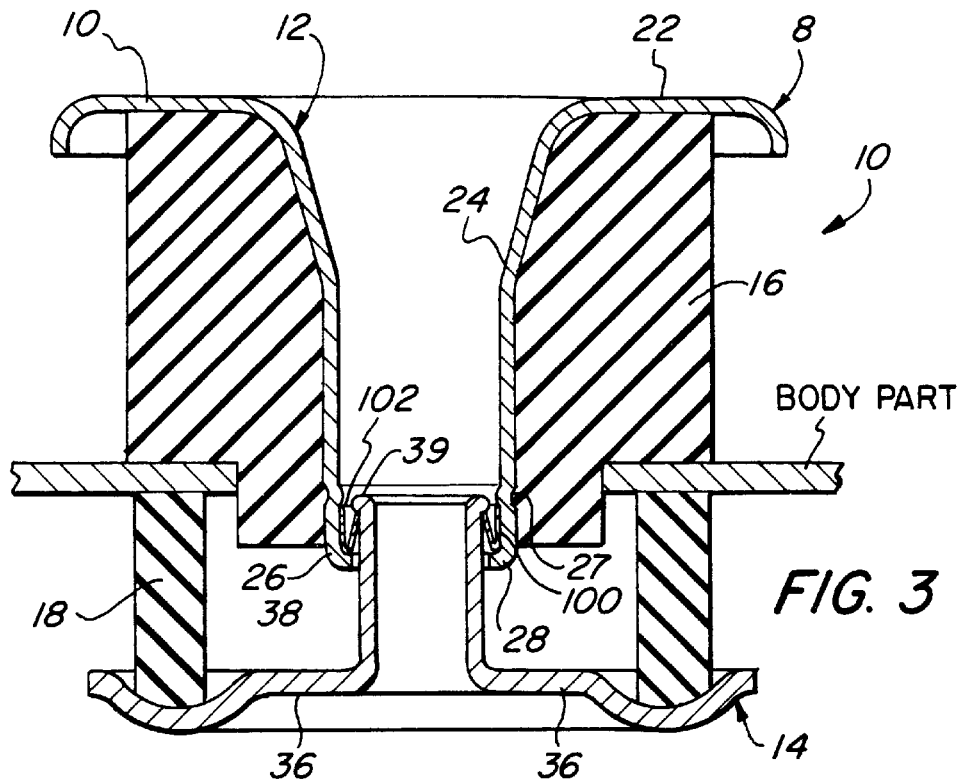
FIG. 3 is a side cross-sectional view of an assembled spacer and thimble of a shock mount incorporating an embodiment of the retainer of the invention.
Figure 1:
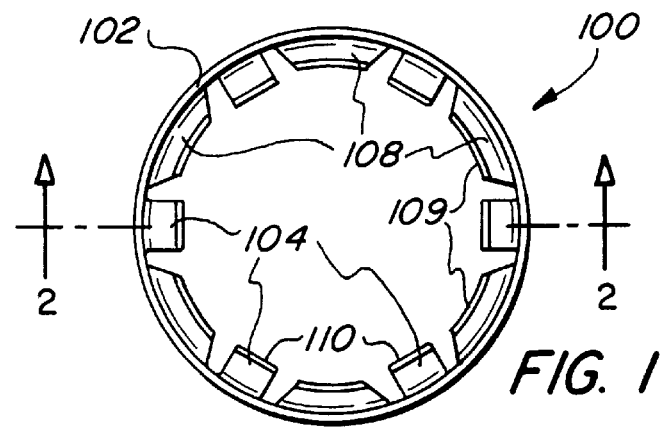
FIG. 1 is a top plan view of an embodiment of the retainer of the invention.
Figure 2:
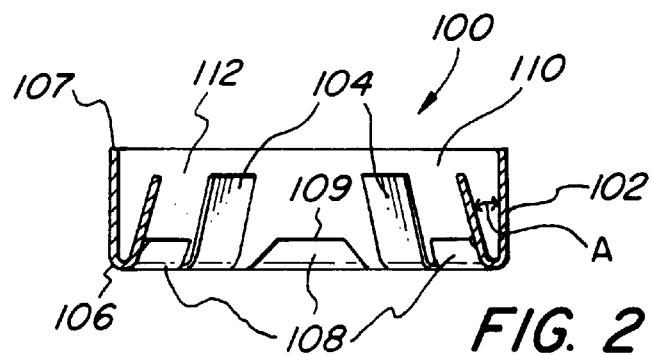
FIG. 2 is a side cross-sectional view of the retainer of FIG. 1.
Figure 4:
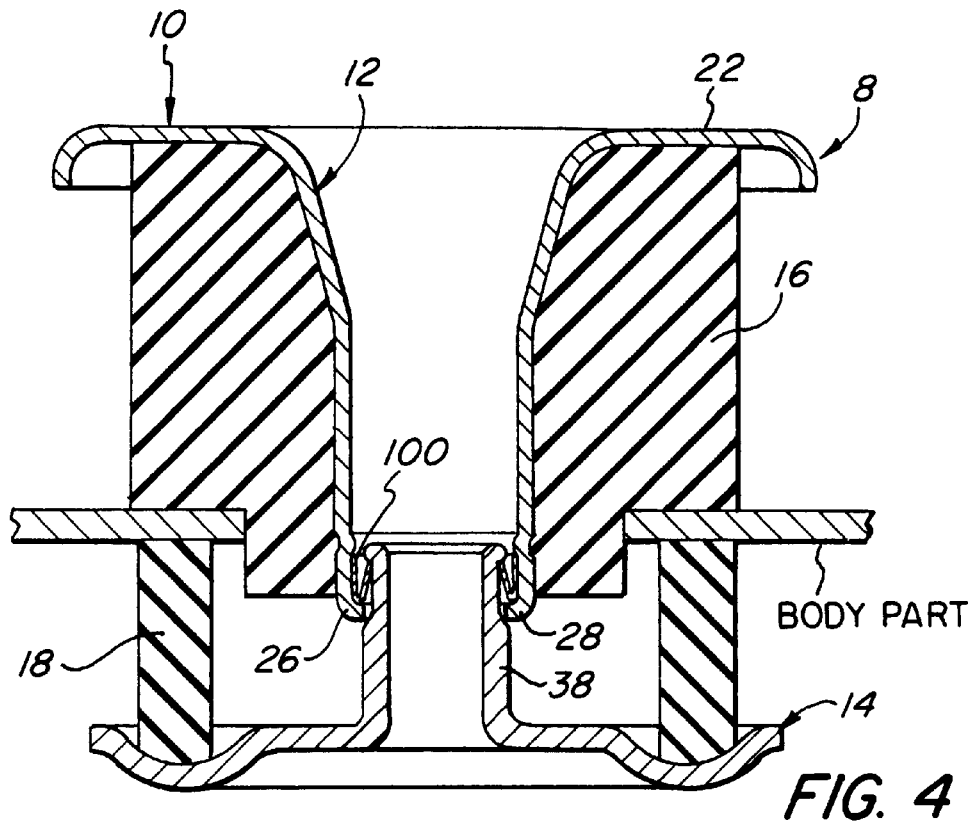
FIG. 4 is a side cross-sectional view of an assembled spacer and thimble of a shock mount in an embodiment of the invention having an improved disassembly.
Figure 5:
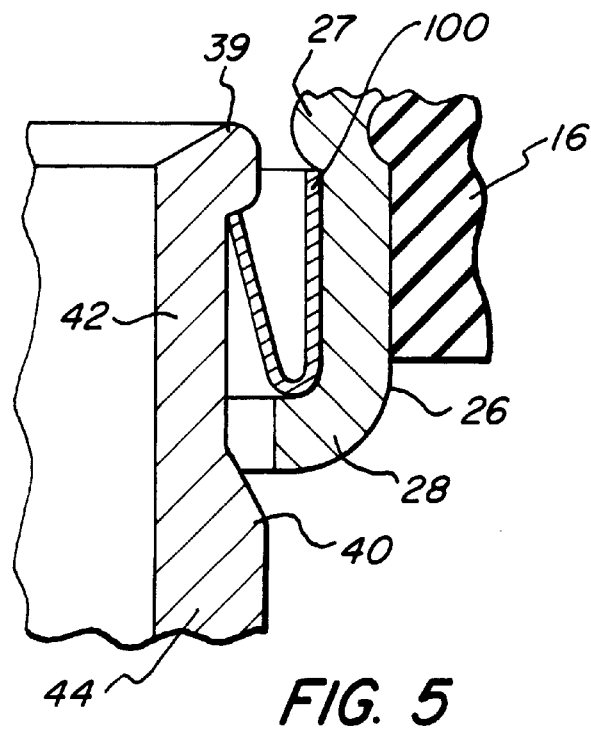
FIG. 5 is a detail view of the thimble tube in the embodiment of FIG. 4.

As shown in FIGS. 3–5, a shock isolator assembly is generally indicated at 10, and comprises a two-part spool, generally indicated at 8, which includes a spacer, generally indicated at 12, a thimble, generally indicated at 14, a first elastically resilient mating ring, generally indicated at 16, and a second elastically resilient mating ring, generally indicated at 18. A threaded fastener, such as carriage bolt (not shown) may be used to secure together the spacer 12 and thimble 14 and to clamp a body part between the mating rings by insertion into the upper end of spacer 12 and threading together with threading on the inner walls of the thimble tube 38 and/or a threaded nut welded to the outer surface of thimble flange 36. The spacer 12, shown in FIGS. 1 and 2, includes an annular flange 22 integral with a tube 24 extending perpendicularly from the flange 22. Spacer tube 24 may be circular in cross-section or it may have a portion of its axial end opposite the spacer flange 22 formed into a polygon.

The thimble 14 is telescopically insertable into the spacer 12. The thimble includes an annular thimble flange 36 integral with a thimble tube 38. The thimble tube 38 may be circular in cross-section or it may have a tube shoulder portion congruent with shape of the spacer tube. Thimble tube 38 is provided with an outwardly extending flange 39 at its free end.

A retainer 100 is held in place in the spacer tube end 26 opposite the spacer flange 22 by a constriction 27 of the spacer 12 and an inwardly extending lip 28.

Retainer 100 comprises an annular ring 102 having first tabs 104 extending radially inwardly from its first end 106. First end 106 is located closest to the end 26 of the spacer tube 24, while second end 107 is located further away from the end 26 of the spacer tube 24. Second tabs 108 which are shorter, and wider (and therefore stiffer or less resilient) than first tabs 104 extend radially inwardly from the same end 106 of ring 102. Preferably, the second tabs 108 are substantially trapezoidal and taper in width from their base connected to the annular ring 102 to their tips 109. Preferably, the first tabs 104 are substantially rectangular. Advantageously, the first tabs 104 are located alternately with the second tabs 108. The first tabs 104 and the second tabs 108 extend radially inwardly at substantially the same angle A relative to the wall 112 of ring 102, or the first tabs 104 may be angled with a smaller angle A relative to wall 112 than the angle between the second tabs 108 relative to wall 112. Preferably, there are six of the holding tabs 104, and six of the aligning tabs 108.

Since the second tabs 108 are shorter than the first tabs 104, the tips 109 of the second tabs 108 when considered together define a substantially circular figure which has a diameter which is greater than the diameter of the substantially circular figure defined by the tips 110 of the first tabs 104.

The thimble tube 38 has an axial length such that when the thimble 14 is inserted into the spacer 12 the thimble tube flange 39 extends beyond the tips 110 of the tabs of spring element 100. The diameter of the circular figure defined by the tips 109 of the second tabs 108 is slightly less than the diameter of the thimble tube flange 39. The diameter of the circular figure defined by the tips 110 of the first tabs 104 is less than the diameter of the thimble tube flange 39. Thus, the thimble tube flange 39 may pass through the tabs 104, 108 but is held in place once it is pushed through the tabs 104, 108.

When the thimble tube 38 is inserted into the spacer tube 24 the thimble tube flange 39 is engaged by the retainer 100. The retainer tabs 104 and 108 may, for example, be bent away from the walls of ring 102 at an angle A of approximately 30–40 degrees to allow the thimble tube flange 39 to be easily pressed into the retainer 100. The retainer 100 is made from a resilient material, such as spring steel or plastic, so that the tabs 104, 108 will bend towards the walls of ring 102 when the thimble tube flange 39 passes through the circle described by the tips 109 and 110 of the tabs 104 and 108, yet will return to their original inclination after the thimble tube flange 39 has passed through. Once inserted, the thimble 14 is prevented from accidental disengagement from the spacer 12 by the engagement of the tabs 104, 108 with the thimble tube flange 39, and a suitable bolt and nut combination can be used to provide a permanent attachment of the shock mount 10.

The present invention provides the desirable lower insertion force for mounting the thimble 14 into the spacer 12 to hold these parts together until they are firmly secured together with the carriage bolt. A low insertion force is provided by sizing the second tabs 108 shorter than first tabs 104 and/or angling the second tabs 108 differently from the angle of the first tabs 104 relative to the ring wall 112, so that the second tabs 108 do not provide significant resistance to the insertion of the thimble tube 38 at the same time as first tabs 104, but do act on the thimble tube flange 39 at the same time as first tabs 104 to provide a higher separation force than the insertion force when attempts are made to withdraw the thimble tube 38 from the spacer tube 24.

A sample retainer made in accordance with the above description, fabricated from sheet metal of 0.015 inch thickness, with a ring diameter of about 0.860 inch and first tabs 104 having a length of about 0.250 inch and a width of about 0.105 inch, and second tabs 108 having a length of about 0.156 inch and a width of about 0.156 inch, with the tabs 104, 108 having an angle relative to wall 112 of about 20 degrees, it was found that the retainer provided a maximum insertion force of 40 lbs. and a separation force of approximately 360 lbs.

An embodiment of the invention which has an improved disassembly feature is shown in FIGS. 4 and 5. In this embodiment the thimble tube 38 is provided with an outer wall diameter which is less at the upper end of thimble tube 38 than at the lower end of thimble tube 38. Thus there is a clearance between the inner lip 28 of the spacer tube 12 and the lesser diameter section 42 at the upper end of the thimble tube 38. When enough compressive force is applied to the spacer 12 and thimble 14 (as by using a clamp) the lip 28 of the spacer tube 28 moves downwardly until it passes thimble tube shoulder 40, whereupon the lip 28 will be forced into the larger diameter section 44, causing the lip 28 to be deformed radially outwardly. The tabs 104, 108 of the retainer 100 are simultaneously deformed and/or broken (depending on the relative sizes and the degree of hardness of the metal of the retainer). This permits relatively easy disassembly of the thimble tube 14 from the spacer tube 12.

Accordingly, the present invention provides a significant and desirable improvement in retainers in shock mounts, by providing a desirably low insertion force coupled with a higher separation force between the thimble 14 and the spacer 12.

What is claimed is:

1. In an assembly for securing a mounting part of a structure onto a support of the type comprising a rigid spacer member having a spacer flange and a spacer tube integral with the spacer flange and projecting from the spacer flange to extend through apertures in resilient bodies, and the support disposed between the bodies and a rigid thimble member having a thimble flange and a thimble tube integral with the thimble flange and projecting from the thimble flange, the thimble tube being receivable inside and displaceable axially relative to the spacer tube, the thimble tube having an outwardly extending flange having a diameter, the improvement comprising:

a retainer located and retained within the spacer tube adjacent an end of the spacer tube, said retainer having an annular ring having a first end which is closest to the end of the spacer tube and a second end which is located furthest away from the end of the spacer tube, the annular ring having resilient first tabs extending radially inwardly from the first end of the annular ring toward the spacer flange, the tabs having tips which define a substantially circular figure having a diameter which is less than the diameter of the thimble tube outwardly extending flange, and second tabs extending radially inwardly from the first end of the annular ring towards the spacer flange, the second tabs being shorter than the first tabs, the tips of the second tabs defining a substantially circular figure having a diameter which is greater than or equal to the diameter of the substantially circular figure defined by the tips of the first tabs and which is less than the diameter of the thimble tube outwardly extending flange;

wherein the thimble tube has a lesser outer radial diameter at an upper portion thereof, and a greater outer radial diameter at a lower portion thereof, and the spacer tube has a spacer tube inner lip at an end of the spacer tube which has a diameter greater than the thimble tube upper portion and lesser than the thimble tube lower portion; and wherein the spacer tube is deformable when the spacer tube is telescoped together with the thimble tube until the spacer tube lip surrounds the thimble tube lower portion.

2. In an assembly for securing a mounting part of a structure onto a support of the type comprising a rigid spacer member having a spacer flange and a spacer tube integral with the spacer flange and projecting from the spacer flange to extend through apertures in resilient bodies, and the support disposed between the bodies and a rigid thimble member having a thimble flange and a thimble tube integral with the thimble flange and projecting from the thimble flange, the thimble tube being receivable inside and displaceable axially relative to the spacer tube, the thimble tube having an outwardly extending flange having a diameter, the improvement comprising:

a retainer located and retained within the spacer tube adjacent an end of the spacer tube, said retainer having an annular ring having a first end which is closest to the end of the spacer tube and a second end which is located furthest away from the end of the spacer tube, the annular ring having resilient first tabs extending radially inwardly from the first end of the annular ring toward the spacer flange, the tabs having tips which define a substantially circular figure having a diameter which is less than the diameter of the thimble tube outwardly extending flange, and second tabs extending radially inwardly from the first end of the annular ring towards the spacer flange, the second tabs being shorter than the first tabs, the tips of the second tabs defining a substantially circular figure having a diameter which is greater than or equal to the diameter of the substantially circular figure defined by the tips of the first tabs and which is less than the diameter of the thimble tube outwardly extending flange;

wherein the thimble tube has a lesser outer radial diameter at an upper portion thereof, and a greater outer radial diameter at a lower portion thereof, and the spacer tube has a spacer tube inner lip at an end of the spacer tube which has a diameter greater than the thimble tube upper portion and lesser than the thimble tube lower portion;

wherein the retainer tabs are deformable or breakable, and the spacer tube lip is deformable; and wherein the thimble tube and the spacer tube can be telescoped together such that one or more of the spacer tube lip and the retainer are moved onto the thimble tube lower portion.

3. In an assembly for securing a mounting part of a structure onto a support of the type comprising a rigid spacer member having a spacer flange and a spacer tube integral with the spacer flange and projecting from the spacer flange to extend through apertures in resilient bodies, and the support disposed between the bodies and a rigid thimble member having a thimble flange and a thimble tube integral with the thimble flange and protecting from the thimble flange, the thimble tube being receivable inside and displaceable axially relative to the spacer tube, the thimble tube having an outwardly extending flange having a diameter, the improvement comprising:

a retainer located and retained within the spacer tube adjacent an end of the spacer tube, said retainer having an annular ring having a first end which is closest to the end of the spacer tube and a second end which is located furthest away from the end of the spacer tube, the annular ring having resilient first tabs extending radially inwardly from the first end of the annular ring toward the spacer flange, the tabs having tips which define a substantially circular figure having a diameter which is less than the diameter of the thimble tube outwardly extending flange, and second tabs extending radially inwardly from the first end of the annular ring towards the spacer flange, the second tabs being shorter and wider than the first tabs, the tips of the second tabs defining a substantially circular figure having a diameter which is greater than or equal to the diameter of the substantially circular figure defined by the tips of the first tabs and which is less than the diameter of the thimble tube outwardly extending flange; the first tabs being located alternately with the second tabs, the first tabs and the second tabs extending radially inwardly at substantially the same angle relative to a sidewall of the annular ring;

wherein the thimble tube has a lesser outer radial diameter at an upper portion thereof, and a greater outer radial diameter at a lower portion thereof, and the spacer tube has a spacer tube inner lip at an end of the spacer tube which has a diameter greater than the thimble tube upper portion and lesser than the thimble tube lower portion; and wherein the spacer tube is deformable when the spacer tube is telescoped together with the thimble tube until the spacer tube lip surrounds the thimble tube lower portion.

4. In an assembly for securing a mounting part of a structure onto a support of the type comprising a rigid spacer member having a spacer flange and a spacer tube integral with the spacer flange and projecting from the spacer flange to extend through apertures in resilient bodies, and the support disposed between the bodies and a rigid thimble member having a thimble flange and a thimble tube integral with the thimble flange and protecting from the thimble flange, the thimble tube being receivable inside and displaceable axially relative to the spacer tube, the thimble tube having an outwardly extending flange having a diameter, the improvement comprising:

a retainer located and retained within the spacer tube adjacent an end of the spacer tube, said retainer having an annular ring having a first end which is closest to the end of the spacer tube and a second end which is located furthest away from the end of the spacer tube, the annular ring having resilient first tabs extending radially inwardly from the first end of the annular ring toward the spacer flange, the tabs having tips which define a substantially circular figure having a diameter which is less than the diameter of the thimble tube outwardly extending flange, and second tabs extending radially inwardly from the first end of the annular ring towards the spacer flange, the second tabs being shorter and wider than the first tabs, the tips of the second tabs defining a substantially circular figure having a diameter which is greater than or equal to the diameter of the substantially circular figure defined by the tips of the first tabs and which is less than the diameter of the thimble tube outwardly extending flange; the first tabs being located alternately with the second tabs, the first tabs and the second tabs extending radially inwardly at substantially the same angle relative to a sidewall of the annular ring;

wherein the thimble tube has a lesser outer radial diameter at an upper portion thereof, and a greater outer radial diameter at a lower portion thereof, and the spacer tube has a spacer tube inner lip at an end of the spacer tube which has a diameter greater than the thimble tube upper portion and lesser than the thimble tube lower portion; and wherein the retainer tabs are deformable or breakable, and the spacer tube lip is deformable; and wherein the thimble tube and the spacer tube can be telescoped together such that one or more of the spacer tube lip and the retainer are moved onto the thimble tube lower portion.

* * * * *